(12) United States Patent
Pang et al.

(10) Patent No.: US 10,708,800 B2
(45) Date of Patent: Jul. 7, 2020

(54) HEALTH REPORT SENDING FROM A WIRELESS COMMUNICATION NETWORK

(71) Applicant: ABB AG, Mannheim (DE)

(72) Inventors: Zhibo Pang, Vaesteras (SE); Gargi Bag, Vaesteras (SE); Morgan Johansson, Vaesteras (SE)

(73) Assignee: ABB SCHWEIZ AG, Baden (CH)

( * ) Notice: Subject to any disclaimer, the term of this patent is extended or adjusted under 35 U.S.C. 154(b) by 37 days.

(21) Appl. No.: 15/996,550

(22) Filed: Jun. 4, 2018

(65) Prior Publication Data

US 2018/0288646 A1 Oct. 4, 2018

Related U.S. Application Data

(63) Continuation of application No. PCT/EP2015/078675, filed on Dec. 4, 2015.

(51) Int. Cl.
*H04W 24/10* (2009.01)
*H04W 88/06* (2009.01)
*H04W 88/16* (2009.01)
*H04W 84/18* (2009.01)

(52) U.S. Cl.
CPC ........... *H04W 24/10* (2013.01); *H04W 88/06* (2013.01); *H04W 88/16* (2013.01); *H04W 84/18* (2013.01)

(58) Field of Classification Search
CPC ..... H04W 24/10; H04W 88/06; H04W 88/16; H04W 84/18

USPC ......................................................... 370/252
See application file for complete search history.

(56) References Cited

U.S. PATENT DOCUMENTS

| 2005/0078672 | A1 | 4/2005 | Caliskan et al. |
| 2010/0182915 | A1* | 7/2010 | Montemurro ......... H04W 24/08 370/252 |
| 2014/0281700 | A1* | 9/2014 | Nagesharao ........ G06F 11/1415 714/15 |
| 2017/0063659 | A1* | 3/2017 | Platon ..................... H04L 45/20 |
| 2017/0182915 | A1* | 6/2017 | Seo ........................ B60N 2/995 |

FOREIGN PATENT DOCUMENTS

WO  WO 2009067509 A2     5/2009
WO  WO 2013170140 A3 *  11/2013

* cited by examiner

*Primary Examiner* — Afsar M Qureshi
(74) *Attorney, Agent, or Firm* — Leydig, Voit & Mayer, Ltd.

(57) ABSTRACT

A wireless terminal for receiving a health report from a wireless communication network comprising a group of network nodes communicating within the wireless communication network using a first communication technology employing a first frequency band includes: a first wireless interface for communicating according to a second communication technology employing a second frequency band; and a terminal control unit for receiving, via the first wireless interface, at least one health report with health data from at least a first node in the group of network nodes triggered by a health report sending condition being fulfilled in the wireless communication network.

41 Claims, 5 Drawing Sheets

HEALTH REPORT SENDING FROM A WIRELESS COMMUNICATION NETWORK

CROSS-REFERENCE TO PRIOR APPLICATION

This application is a continuation of International Patent Application No. PCT/EP2015/078675, filed on Dec. 4, 2015, the entire disclosure of which is hereby incorporated by reference herein.

FIELD

The invention relates to the determining of health of nodes in a wireless communication network. More particularly, the invention relates to a wireless terminal for receiving a health report from a wireless communication network, a method, computer program and computer program product for receiving a health report from a wireless communication network, a health reporting system for a wireless communication network as well as a method, computer program and computer program product for enabling sending a health report from a wireless communication network.

BACKGROUND

Building/home automation devices are intended to enable energy efficient climate control, provide comfort and security to the residents of a house. Wireless alternatives such as Zigbee, Internet Engineering Task Force Internet of things (IETF IoT) stack is an attractive option for implementing communication in a home or residential automation system considering the ease of deployment and retrofitting to older buildings.

However connectivity of wireless links based on a wireless communication network using a communication technology such as IPv6 over Low power Wireless Personal Area Networks (6L0WPAN), Zigbee etc. can degrade due to interference, obstruction etc.

In order to improve user experience as well as to implement a more effective automation system, it is imperative that faults in the network are easily identified and connectivity is quickly restored. However many industrial networks such as 6L0WPAN and Zigbee based networks do not provide a solution for monitoring of wireless links which will enable quick detection of broken links. Furthermore, it is possible that a user of the automation system does not have the ability to communicate with the wireless communication network using the communication technology employed by the automation system.

There is therefore a need for addressing some or all of the above-mentioned problems.

SUMMARY

In an embodiment, the present invention provides a wireless terminal for receiving a health report from a wireless communication network comprising a group of network nodes communicating within the wireless communication network using a first communication technology employing a first frequency band, the wireless terminal comprising: a first wireless interface for communicating according to a second communication technology employing a second frequency band; and a terminal control unit configured to receive, via the first wireless interface, at least one health report with health data from at least a first node in the group of network nodes triggered by a health report sending condition being fulfilled in the wireless communication network.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 shows a block schematic of some functionality in a first of the network nodes, FIG. 5 schematically shows a flow chart of method steps in a first embodiment of a method of receiving a health report from the wireless communication network being performed by the wireless terminal, FIG. 6 schematically shows a number of method steps in a first embodiment of a method of enabling sending a health report from a wireless communication network and being performed in the network gateway device, FIG. 7 schematically shows a number of method steps in the first embodiment of the method of enabling sending a health report from the wireless communication network and being performed in the first network node, FIG. 8 schematically shows a number of method steps in a second embodiment of the method of enabling sending a health report from the wireless communication network and being performed in the first network node, FIG. 9 schematically shows a number of method steps in a third embodiment of the method of enabling sending a health report from the wireless communication network and being performed in the first network node, FIG. 10 schematically shows a computer program product in the form of a CD ROM disc with a computer program performing the functionality of the wireless terminal, and FIG. 11 schematically shows a computer program product in the form of a CD ROM disc with a computer program performing the functionality of the network gateway device.

DETAILED DESCRIPTION

This object is according to a first aspect achieved by a wireless terminal for receiving a health report from a wireless communication network comprising a group of network nodes communicating within the wireless communication network using a first communication technology employing a first frequency band, the wireless terminal comprising: a first wireless interface for communicating according to a second communication technology employing a second frequency band and a terminal control unit configured to: receive, via the first wireless interface, at least one health report with health data from at least a first node in the group triggered by a health report sending condition being fulfilled in the wireless communication network.

This object is according to a second aspect achieved through a method for receiving a health report from a wireless communication network comprising a group of network nodes communicating within the wireless communication network using a first communication technology employing a first frequency band, the method being performed in a wireless terminal and comprising: receiving at least one health report with health data from at least a first node in the group using a second communication technology employing a second frequency band triggered by a health report sending condition being fulfilled in the wireless communication network.

The object is according to a third aspect also achieved through a computer program for receiving a health report from a wireless communication network comprising a group of network nodes communicating within the wireless communication network using a first communication technology employing a first frequency band, the computer program comprising computer program code which when run in a wireless terminal, causes the wireless terminal to: receive at least one health report with health data from at least a first node in the group using a second communication technology employing a second frequency band triggered by a health report sending condition being fulfilled in the wireless communication network.

The object is according to a fourth aspect further achieved through a computer program product for receiving a health report from a wireless communication network comprising a group of network nodes communicating within the wireless communication network. The computer program product is provided on a data carrier and comprises the computer program code of the third aspect.

Another object is to enable a determining of the health of nodes in a wireless communication system in a simple way.

This object is according to a fifth aspect achieved through a health reporting system for a wireless communication network comprising a group of network nodes communicating within the wireless communication network using a first communication technology employing a first frequency band, the health reporting system comprising: a first node in the group having a first wireless interface for communication using the first wireless technology, a second wireless interface for communication using a second communication technology employing a second frequency band and a node control unit configured to obtain health data internally in the node and send the health data to the wireless terminal in a health report via the second wireless interface triggered by a health report sending condition being fulfilled in the wireless communication network.

The object is according to a sixth aspect also achieved through a method of enabling sending a health report from a wireless communication network that comprises a group of network nodes communicating within the wireless communication network using a first communication technology employing a first frequency band, the method comprising: obtaining health data internally in a first node of the group, and sending the health data in a health report from the first node to the wireless terminal using a second communication technology employing a second frequency band triggered by a health report sending condition being fulfilled in the wireless communication network.

The object is according to a seventh aspect furthermore achieved through a computer program for enabling sending a health report from a wireless communication network that comprises a group of network nodes communicating within the wireless communication network using a first communication technology employing a first frequency band, the computer program comprising computer program code which when run in at least one first node in the group of nodes in the wireless communication network, causes the first node to: obtain health data internally the node, and send the health data in a health report from the first node to the wireless terminal using a second communication technology employing a second frequency band triggered by a health report sending condition being fulfilled in the wireless communication network.

The object is according to an eighth aspect also achieved through a computer program product for enabling sending a health report from a wireless communication network that comprises a group of network nodes communicating within the wireless communication network. The computer program product is provided on a data carrier and comprises the computer program code of the seventh aspect.

In an advantageous variation of the fifth and sixth aspects, the first node receives a message asking for the health report, the reception of which fulfils the health report sending condition, where the message may be an instruction to send the health report received from a network gateway device.

In this case the system may further comprise the network gateway device having a first interface for wireless communication with the nodes of the group using the first communication technology, at least one further interface for communication using another communication technology and a gateway control unit configured to receive, from the wireless terminal and via the further interface, a request for a health report concerning at least the first node in the group and send the instruction via the first interface to at least said first node in the group to send the health report using the second communication technology.

In this case the method may further comprise receiving, in the network gateway device from the wireless terminal using another communication technology than the first communication technology, a request for a health report concerning at least the first node in the group and sending, from the network gateway device using the first communication technology, the instruction to at least the first node in the group to send the health report using the second communication technology.

The invention according to the above-mentioned aspects has a number of advantages. It allows the detecting of broken links in wireless networks that lack link monitoring functionality. The detection is also possible to be made in a fast and efficient way. The invention also allows a wireless terminal to obtain health reports even if it has no ability to communicate using the first communication technology. Furthermore, since health reports are being sent using the second communication technology, they do not waste any of the capacity in the wireless communication network. This means that more of the capacity of this network can be used more efficiently for the main activities of the nodes.

It should be emphasized that the term "comprises/comprising" when use d in this specification is taken to specify the presence of stated features, integers, steps or components, but does not preclude the presence or addition of one or more other features, integers, steps, components or groups thereof.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards sending health reports from nodes in a wireless communication network providing communication in a home or residential automation system. The wireless communication network may with advantage be a wireless sensor and actuator network where building/home automation devices are provided to enable energy efficient climate control, provide comfort and security to the residents in a building or a home. The wireless communication network comprises different actuators and sensors for the building/home automation system.

Figure 1:
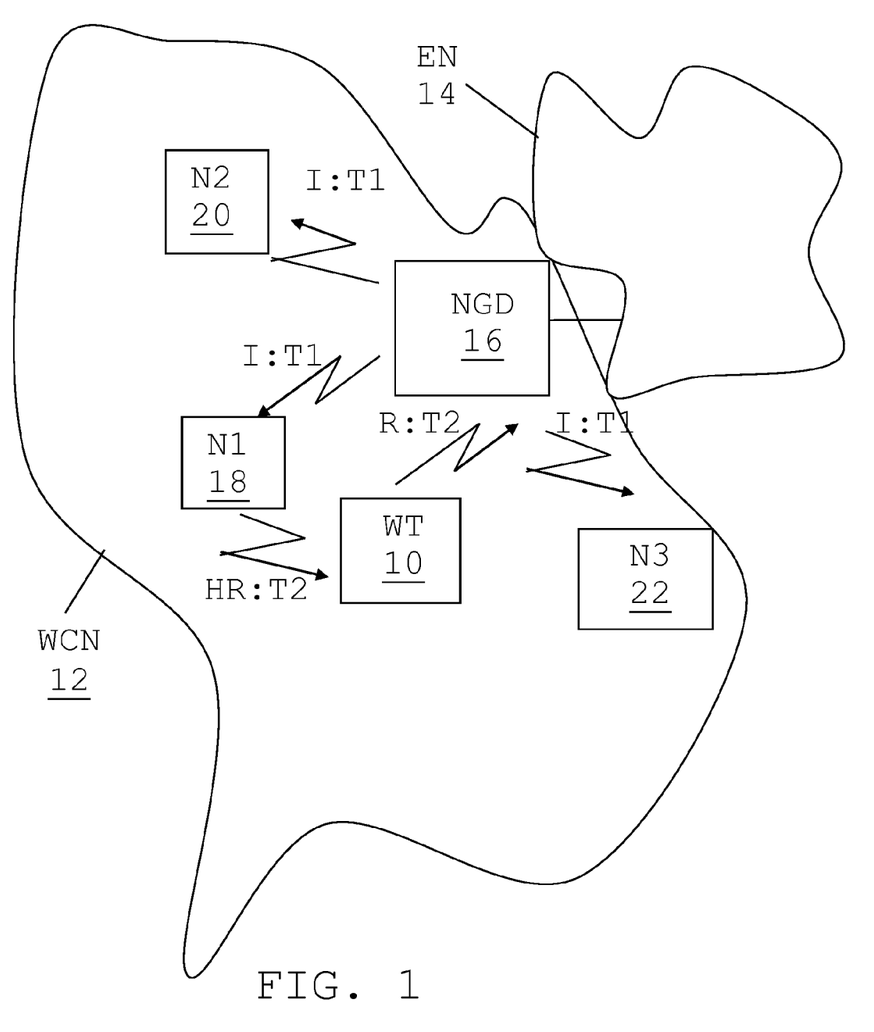
FIG. 1 schematically shows a wireless terminal, an external network together with a wireless communication network comprising a network gateway device and network nodes for an automation system.

FIG. 1 schematically shows one such wireless communication network WCN 12 that comprises a group of nodes, where the group here comprises three nodes. There is a first node Ni 18, a second node N2 20 and a third node N3 22. The number of nodes shown is just an example. It should be realized that there may be more and in fact also fewer nodes in the wireless communication network 12. The nodes perform sensor and actuator functions in the home or residential automation system. Furthermore, they are all able to communicate within the wireless communication network 12 using a first communication technology T1 that is assigned a first frequency band. The first communication technology may be any type of local wireless communication technology, such as IPv6 over Low power Wireless Personal Area Networks (6L0WPAN) or Zigbee. These types of communication techniques are however not that readily available outside of the building. Furthermore, they may lack the ability to perform network link monitoring. Other examples of the first communication technology comprise Thread, EnOcean, Bluetooth Low Energy (BLE), Bluetooth and Digital Enhanced Cordless Telecommunications Ultra Low Energy (DECT ULE).

For these and other reasons there may exist a need for accessing the wireless communication network 12 from the outside. Therefore, the wireless communication network 12 also comprises a network gateway device NGD 16, which provides a link to networks outside of the wireless communication network 10. The network gateway device 16 may as an example be a so-called border router. In an example given here, the network gateway device 16 is connected to an external network EN 14, which may be any type of network, such as a fixed or mobile telecommunication network, a Local Area Network (LAN) or a Wireless LAN (WLAN) network with Internet connectivity or any other type of network.

The three nodes 18, 20, 22 are all shown as receiving an instruction I from the network gateway device 14, which instruction I is sent using the first communication technology T1. The purpose of this instruction I will be described later.

A user of such a home automation system will normally own or have access to a wireless terminal WT 10, such as a cellular phone or a portable computer such as a palm or lap top computer. Furthermore, it is possible to download software, such as an application, into the wireless terminal via a Webshop such as AppStore or GooglePlay. However, the wireless terminal 10 is more likely than not lacking in ability to communicate using the first communication technology T1. It may however be equipped with the ability to communicate according to a second communication technology T2 using a second frequency band, such as a short-range communication technology like Bluetooth or Nearfield communication (NFC). According to aspects of the invention also one or more of the network nodes 18, 20 and 22 of the group as well as possibly also the network gateway device 16 has this ability to communicate using this second communication technology T2. It may here be mentioned that the second communication technology may be any of the technologies mentioned above in relation to the first communication technology.

In FIG. 1, the wireless terminal 10 is shown as sending a request R to the network gateway device 16 using the second communication technology T2 and the first network node 18 is shown as sending a health report HR to the wireless terminal 10 also using this second communication technology T2. What this request R and health report HR concern will also be described later. In this respect it may also be mentioned that the second communication technology T2 is different than the first communication technology and the second frequency band is different than the first frequency band. The communication in the second frequency band is thus an out-of-band communication in relation to the first frequency band. Because of this it should be realized that even though FIG. 1 shows the wireless terminal 10 as being located in the wireless communication network 12, it is in fact no node of this network as it does not have any capability to use the first communication technology T1.

Figure 2:
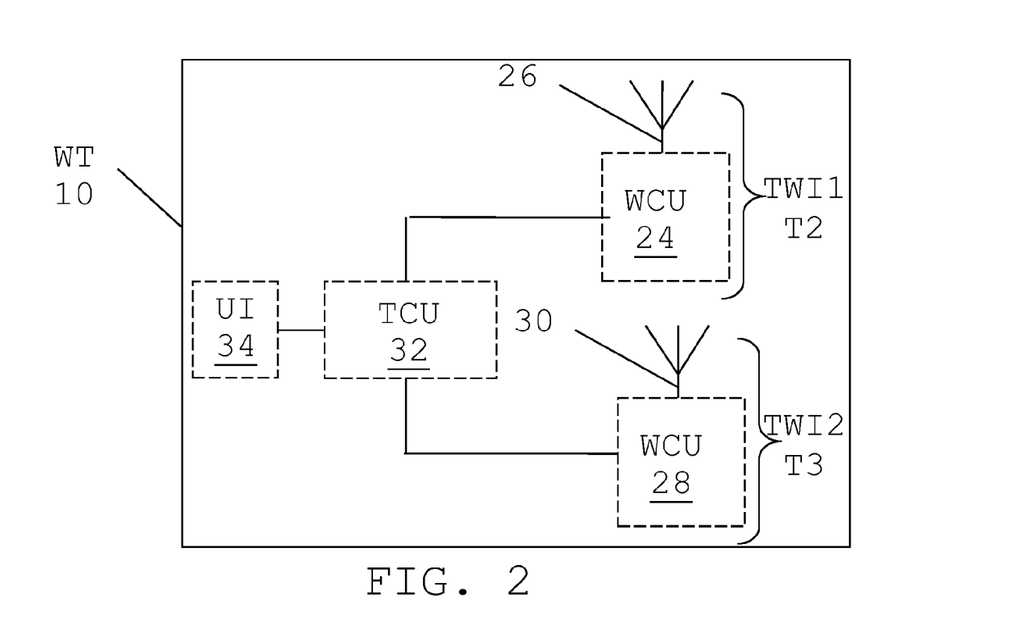
FIG. 2 shows a block schematic of some functionality in the wireless terminal.

FIG. 2 shows a block schematic of some of the functionality in the wireless terminal 10. The wireless terminal 10 comprises a first wireless communication unit WCU 24, which may be a radio circuit configured to communicate according to the second communication technology T2 and connected to a first antenna 26, where the first wireless communication unit 24 and antenna 26 together form a first terminal wireless interface TWI1. There is also an optional second wireless communication unit WCU 28, which may be a radio circuit configured to communicate according to a third communication technology T3, such as the WiFi standard or a suitable mobile communication standard like Long Term Evolution (LTE) and connected to a second antenna 30, where the second wireless communication unit 28 and antenna 30 together form a second terminal wireless interface TWI2. Both the radio circuits 24 and 28 are furthermore connected to a terminal control unit 32, which terminal control unit 32 is finally connected to a user interface 34, via which a user may make inputs and be displayed various information. The user interface 34 may comprise a screen as well as a tactile user input unit such as a keyboard or a keypad. It may also be realized as a touch screen.

It should here be realized that as an alternative the first and second wireless communication units 24 and 28 may share the same antenna. This means that the first terminal wireless interface TWI1 may be formed through the combination of the first wireless communication unit 24 and common antenna and the second terminal wireless interface TWI2 may be formed through the combination of the second wireless communication unit 28 and the common antenna.

Figure 3:
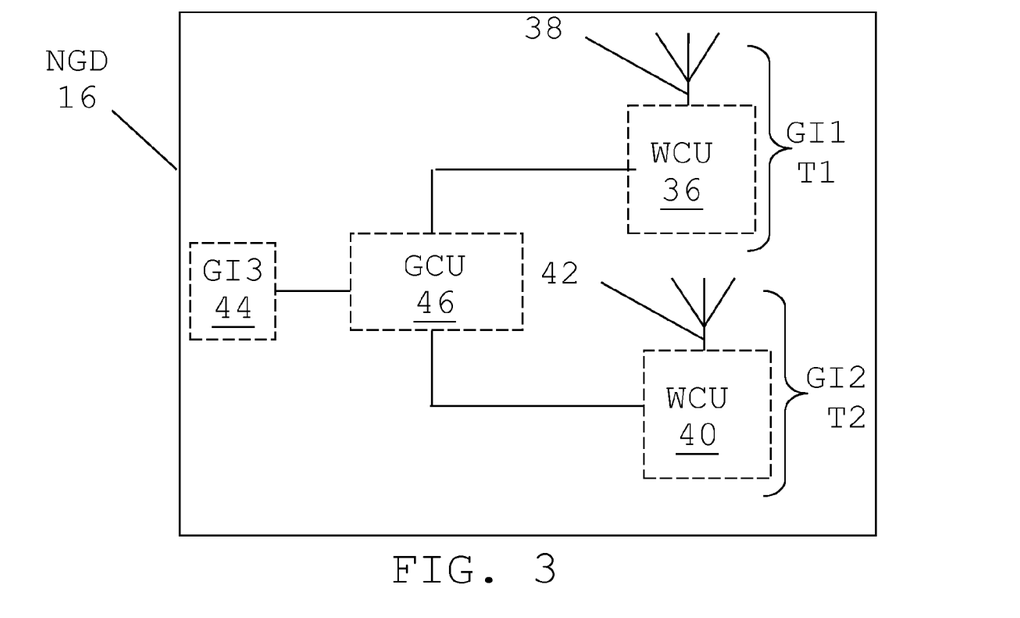
FIG. 3 shows a block schematic of some functionality in the network gateway device.

FIG. 3 shows a block schematic of some of the functionality in the network gateway device 16. The network gateway device 16 comprises a first wireless communication unit WCU 36, which may be a radio circuit configured to communicate according to the first communication technology T1 and connected to a first antenna 38, where the first wireless communication unit 36 and antenna 38 together form a first gateway interface Gi1. There is also at least one further interface for communication with another communication technology. In the example in FIG. 3 there are two further interfaces, a second gateway interface GI2 and a third gateway interface GI3. In order to form the second gateway interface GI2 there is a second wireless communication unit WCU 40, which may be a radio circuit configured to communicate according to the second communication technology T2 connected to a second antenna 42. The second gateway interface GI2 may thus be provided for wireless short-range communication. The third gateway interface GI3 44, which may be a wireless interface for instance for wireless long-range communicating using LTE or WiFi or a wired interface for communicating via LAN using Ethernet or for communicating using a Public Switched Telecommunication Network (PSTN). The radio circuits 36 and 40 as well as the third gateway interface 44 are furthermore connected to a gateway control unit 46. It is possible to omit either of the second or third gateway interface from the network gateway device.

It should here be realized that as an alternative the first and second wireless communication units 36 and 40 may share the same antenna. This means that the first gateway interface Gi1 may be formed through the combination of the first wireless communication unit 36 and common antenna and the second gateway interface GI2 may be formed through the combination of the second wireless communication unit 40 and the common antenna.

Figure 4:
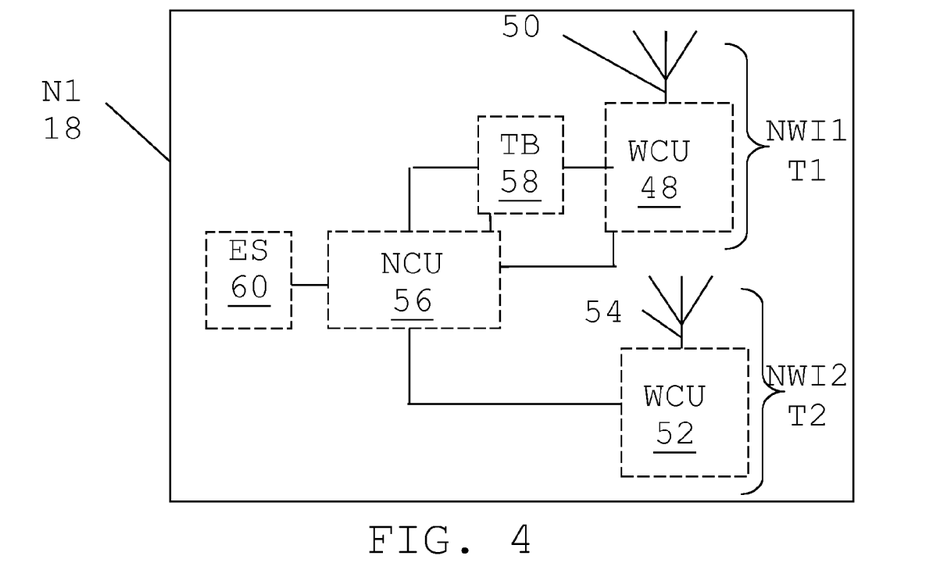

FIG. 4 shows a block schematic of some of the functionality in the first network node 18 in the wireless communication network 12. The first network node 18 comprises a first wireless communication unit WCU 48, which may be a radio circuit configured to communicate according to the first communication technology T1 and connected to a first antenna 50, where the first wireless communication unit 24 and antenna 26 together form a first node wireless interface NWI1. There is also a second wireless communication unit WCU 52 configured to communicate according to the second communication technology T2 and connected to a second antenna 54, where the second wireless communication unit 52 and antenna 54 together form a second node wireless interface NWI2. The first wireless communication unit 48 is connected to a node control unit NCU 56 via a transmitting buffer TR 58, while the second wireless communication unit 52 is directly connected to the node control unit 56. There is also an energy source ES 60, such as a battery, providing energy for powering of the node. The node control unit 56 is furthermore connected to the energy source 60, the transmitting buffer 58 and the first wireless communication unit 48 in order to be able to fetch or receive health data from these units.

It should also here be realized that as an alternative the first and second wireless communication units 48 and 52 may share the same antenna. This means that the first node wireless interface NWI1 may be formed through the combination of the first wireless communication unit 48 and common antenna and the second node wireless interface NWI2 may be formed through the combination of the second wireless communication unit 52 and the common antenna.

The above-described first node functionality may also be provided in one or more of the other network nodes and with advantage in all of them.

As was mentioned above, the wireless communication network 12 may be provided for an automation system in a home or in a building, where sensors and actuators are nodes in the system communicating wirelessly. However connectivity of the wireless links between the nodes can degrade due to interference, obstructions and congestion in the wireless communication network. It is also possible that low battery power level can cause the degradation of such links.

A person, such as a person handling maintenance in the building or the owner of a household may want to be able to identify such problems in an easy and efficient way.

Today it is often of interest to have various types of functions in wireless terminals such as in lap or palm top computers or in cellular phones, where such functionality may be provided in an application, for instance in a so-called App that may be downloaded from Web stores such as App Store or Google Play. This has the advantage of allowing such applications to be downloaded into virtually any type of wireless terminal.

However, the wireless communication network 12 that is used for realizing communication for an automation system does often use a communication technology that is not supported by many wireless user terminals. It is therefore not easy to obtain the above-mentioned connectivity data using a wireless user terminal functionality that lacks the communication technology of the wireless communication network 12. Furthermore, even if a wireless terminal has this capability, it may be hard to obtain data from a network node if the link it uses does not work. Furthermore, it is also possible that the first communication technology T1 does not have the ability to monitor network connections, which also makes it hard to identify if there are any broken links. In addition to this, if the bad link is caused by network congestion, then the sending of health reports in the wireless communication network will make the network even more congested. Furthermore, even if the wireless communication network is not congested, the sending of health reports in it will still lead to an unnecessary limitation of the network capacity.

The present invention is provided for addressing at least some of the above-mentioned problems.

Figure 5:
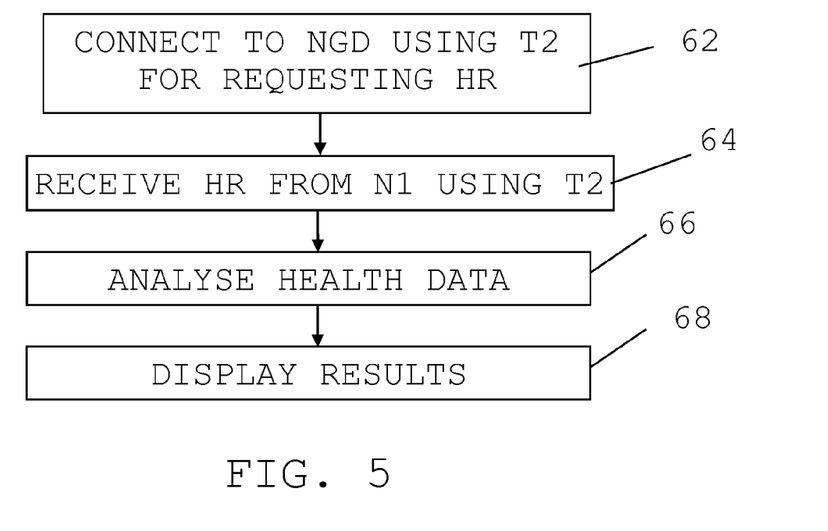
Figure 6:
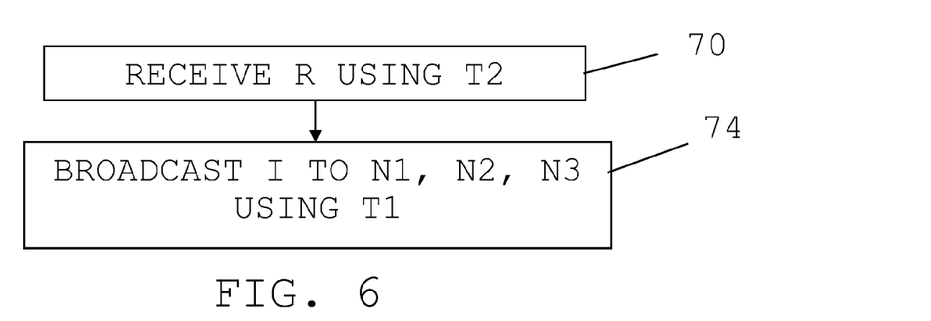
Figure 7:
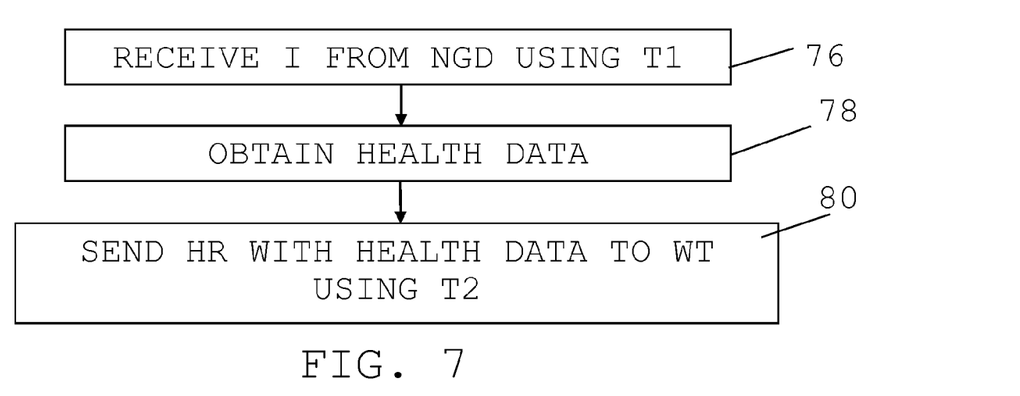

A first embodiment of the invention addressing at least some of the above-mentioned problems will now be described with reference also being made to FIGS. 5, 6 and 7, where FIG. 5 shows a flow chart of method steps in a method of receiving a health report from a wireless communication network and being performed by the wireless terminal, FIG. 6 shows a number of method steps in a method of enabling sending a health report from a wireless communication network being performed in the network gateway device and FIG. 7 shows a number of method steps in the method of enabling sending a health report from the wireless communication network being performed in the first network node.

Here it may be mentioned that a health reporting system may be provided in the wireless communication system. A health reporting system may only comprise one device, such as the network gateway device 16 or a node in the group, such as the first node 18. As an alternative it is possible that a health reporting system is formed by some or all of the nodes in the group optionally together with the network gateway device.

The operation of the first embodiment will now be described in some more detail.

The above-described user may note that there is a fault related to one of the nodes 18, 20 or 22 in the wireless communication network 12, such as a link of one of the nodes being broken, where a broken link may be unidirectional or a bidirectional link. A node may for instance be able to receive data but unable to transmit data or vice versa. A broken link may be observed through the user for instance noting that a node does not respond to commands or a control function does not respond to changes in physical properties sensed by a node. Whenever a node does not function as expected, the user can start a get diagnostic information application running in the terminal control unit 32 of the wireless terminal 10. The user may therefore start operation through triggering "Get Diagnostic Information" in the application running in the wireless terminal 10, which activation is typically performed via the user interface 34.

The application running in the terminal control unit 32 will then connect to the network gateway device 16 for requesting R one or more health reports HR from the nodes 18, 20, 22 of the wireless communication network 10, which nodes are thus actuators or sensors in the automation system. There are a number of way in which this may be done.

The terminal control unit 32 may as an example connect to a wireless network such as a WiFi or mobile communication network and send a request R for a health report to this network using the second terminal wireless interface TWI2 and the third communication technology T3. The request R may then be received by the gateway control unit 46 of the network gateway device 16 via the external network 14 and the third gateway interface GI3. As an alternative and as is done in this first embodiment, the user brings the wireless terminal 10 within range of the network gateway device 16 for communication according to the second communication technology T2, which in case the second communication technology is short-range communication such as Bluetooth, is the range within which the wireless terminal 10 and the network gateway device 16 may be able to communicate with each other using the technology.

Thereby the terminal control unit 32 of the wireless terminal 10 connects to the network gateway device 16 via the first terminal wireless interface TWI1 using the second communication technology T2 for requesting one or more health reports, step 62. It thus sends a request R for one or more health reports HR to the network gateway device 16. Here the health may be related to the ability of a network node to connect to other nodes of wireless communication network 10. The health may be related to the ability to receive data or transmit data over a link or to both. There may furthermore be a one to one correspondence between network nodes and health reports. The sending of this request causes a health report sending condition to be fulfilled in the wireless communication network and may more particularly cause the health report sending condition to be fulfilled in one or more of the network nodes of the group. Each network node may generate an own health report. Thereby a request for a health report may be a request for a single health report, which may be dedicated to a specific network node that needs to be investigated. Alternatively it may be a request for health reports from several network nodes. In the present example the request R is a request for a health report HR from every network node having the capability to communicate according to the second communication technology or technique T2.

The gateway control unit 46 of the gateway control device 16 then receives the request R for health reports via a communication interface that is different from the first gateway communication interface Gi1. Thereby the request is received using another communication technology than the first communication technology T1. In the present example of the first embodiment this other communication technology is the second communication technology T2. Thereby the different communication interface is also the second gateway interface GI2. As was discussed above, other communication technologies could also be used.

The wireless terminal thus sends a request R to the network gateway device 16 or Border Router asking the building automation devices, i.e. the network nodes, to send health reports using the second communication technology T2, which, as was described above, may be Bluetooth.

Therefore the gateway control unit 46 of the network gateway device 16 receives the request R for one or more health reports via the second gateway communication interface GI2 and using the second communication technology T2, step 70. Thereafter the gateway control unit 46 sends a message asking for a health report. In this first embodiment the message asking for a health report is an instruction I to send a health report HR to one or more of the network nodes 18, 20, 22. The instruction I is sent in the wireless communication network 12 and therefore it is sent using the first communication technology T1. As described earlier, it is possible that some nodes lack the capability to communicate with the second communication technology T2. In this case it is possible that no instruction is sent to such nodes. It is also possible that the wireless terminal 10 pinpointed the network nodes that it wanted to receive health reports from. In this case the instruction may only be sent to the pinpointed network nodes.

In the present example of the first embodiment, the instruction I is sent to all network nodes in the wireless communication network 12. The gateway control unit 46 therefore broadcasts the instruction I to all the nodes 18, 20, 22 via the first gateway communication interface Gil using the first communication technology T1, step 74.

The network gateway device 16 may thus broadcast the instruction I in the wireless communication network 12 using the first communication technology T1, which may be IEEE 802.15.4 6LowPA, Thread, EnOcean, BLE or DECT ULE.

The instruction I is then received in one or more of the network nodes and in this example in all of the network nodes 18, 20, 22 using the first communication technology T1. Through the reception of the message, which in this first embodiment is the instruction I, a health report sending condition is fulfilled, which condition when fulfilled in a network node triggers the sending of a health report. The nodes will then gather health data for a health report. However, they may not all send their health reports. It is possible that a number of additional health report sending conditions also have to be fulfilled for a health report actually being sent. It is for instance possible that a health report is only sent if the wireless terminal is in range for communication according to the second communication technology T2. It is also possible that a health report is only sent if the network node and the wireless terminal are paired with each other.

In the following operation of the network nodes according to the first embodiment will be described in relation to the first network node 18, which is the one with which the wireless terminal 10 will communicate according to the given example. However, as all the network nodes in the group have the ability to communicate according to the second communication technology T2, each of them may also be able to perform all the steps being described below. However, the activity in the last step of sending a health report may in a specific case only be performed by one or a few of the network nodes based on being approached by the user carrying his or her wireless terminal 10.

The node control unit 56 of the first network node 18 thus receives the instruction I via the first node wireless interface NWI1 using the first communication technology T1, step 76, which thus fulfils the health report sending condition that triggers health report sending activities. Thereafter the node control unit 56 obtains health data, step 78. The health data is furthermore obtained internally in the node.

Health data may here be link quality data setting out the quality of wireless links to one or more neighbouring nodes in the wireless communication network 12. Link quality data may be such things as signal strength, signal to interference and noise ratios, bit error rate BER etc. The node control unit 56 may obtain such link quality data from the first wireless communication unit 48, which may be set to measure it via the first antenna 50. Health data may also be buffer usage data, such as the size of the transmission queue in the transmitting buffer 58. The node control unit 56 may therefore also connect to the transmitting buffer 58 for obtaining data about the available space in the transmission buffer 58. It may also connect to the energy source 60 to obtain node energy level data, such as battery level data that may indicate a remaining battery level.

When the health data has been gathered by the node control unit 56, it may then wait for the wireless terminal 10 to get in range for communication according to the second communication technology T2.

The user may now move with the wireless terminal 10 to within range of the first network node 18 for communication using the second communication technology T2. When this happens, the node control unit 56 of the first network node 18 then sends a health report HR with health data to the wireless terminal 10 via the second node wireless interface NWI2 using the second communication technology T2, step 80. It is here possible that the health report HR is only sent if there exists a pairing between the first network node 18 and the wireless terminal 10.

The health report HR is thus received in the wireless terminal 10. More particularly, the application being run in the terminal control unit 32 receives the health report HR from the first network node 18 via the first terminal wireless interface TWI1 using the second communication technology T2, step 64. Thereafter the terminal control unit 32 analyses the health data in the health report HR to determine if any wireless link of the first node is broken, step 66.

Health data may be diagnostic data used to determine if any of the network node links is broken. The terminal control unit 32 thus analyses the diagnostic health data that may contain information such as link quality information of the links with its neighbours, available battery power, and number of packets in the queue that needs to be forwarded.

The analysis may involve identifying the source of the connectivity problem of the node, which can be due to congestion, interference from other wireless sources, obstruction such as walls and failure of a node. If there is a lot of data in a transfer buffer needing to be transferred, this may be an indication that there is congestion in the wireless communication network. It may also be an indication of a bad link where there are a lot of retransmissions. A low battery level may likewise be an indicator of a bad link, since the network node may be required to transmit at low power levels when the battery level is low. The results of the analysis may furthermore be displayed by the terminal control unit 32 to the user via the user interface 34, step 68, whereupon the user may remove the cause of the broken connection. If for instance the energy level of the energy source is low, the user may exchange the energy source for a new one. In case the fault is due to interference the user may move an obstructing object or the network node.

Figure 8:
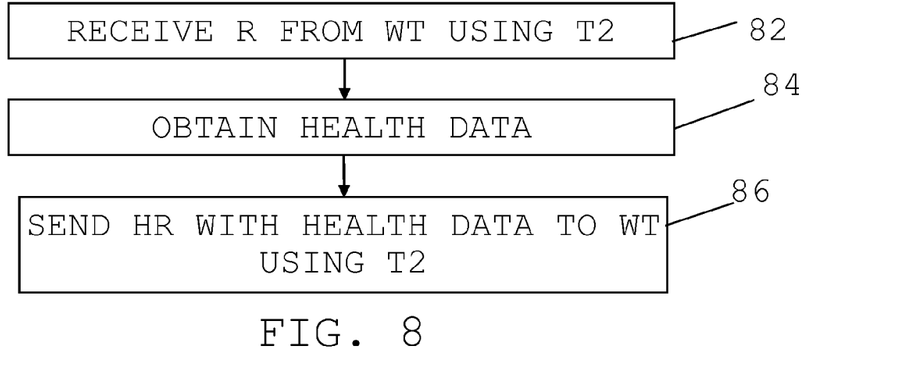

A second embodiment will now be described with reference being made to FIG. 8, which shows a number of method steps in the method of enabling sending a health report from the wireless communication network being performed in the first network node.

In this second embodiment the wireless terminal 10 sends a request for a health report. The operation may also in this embodiment start with the user triggering "Get Diagnostic Information" in the application running in the wireless terminal 10. The application running in the terminal control unit 32 will then connect to the wireless communication network for requesting R a health report HR. The connection may again typically be made using the first terminal wireless interface TWI1 using the second communication technology T2. However, the request is in this case not sent to the network gateway device 16, but directly to the first node 18.

The node control unit 56 of the first network node 18 thus receives the request from the wireless terminal 10, which in this case is received via the second node wireless interface NWI2 using the second communication technology T2, step 82, which reception fulfils the health report sending condition that triggers health report sending activities. The message asking for a health report is thus in this case the directly received request R. Thereafter the node control unit 56 obtains health data internally in the node, step 84, which may be done in the same way as in the first embodiment.

When the health data has been gathered by the node control unit 56, it then sends the health report HR with health data to the wireless terminal 10 via the second node wireless interface NWI2 using the second communication technology T2, step 86. Thereafter the wireless terminal receives and processes the health report, which may be done in the same way as in the first embodiment.

As the request is received by the first node 18 directly from the wireless terminal 10, it would have to be in range. Therefore there is normally no waiting for the wireless terminal 10 to get in range in this embodiment. There may however still be a requirement for the existence of a pairing.

Figure 9:
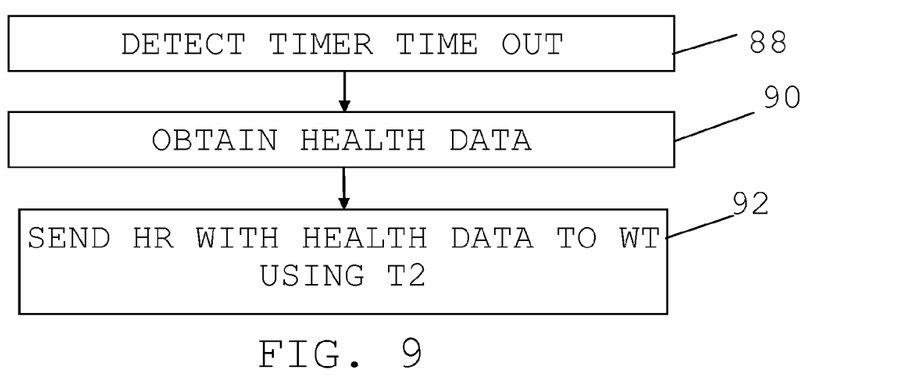

In a third embodiment there is no request for a health report being sent by wireless terminal 10. Instead the first network node 18 detects that the health report sending condition is fulfilled.

How this may be done will now be described with reference being made to FIG. 9, which shows a number of method steps in the method of enabling sending a health report from the wireless communication network being performed in the first network node.

In this case the first network node detects that the health report sending condition is fulfilled. It may detect this through monitoring any of the above described health data, compare a piece of health data with a corresponding threshold and detect that the condition is fulfilled if the threshold is crossed. It may for instance be possible to compare the battery level with a battery level threshold and determine that the health report sending condition is fulfilled if the remaining battery level falls below a batter level threshold. However, in the example given here and shown in FIG. 9, the condition is fulfilled through a timer having expired, which timer counts the time since the setup of the wireless communication network was completed. The expiry of the timer thus fulfils the health report sending condition. The node control unit 56 thus detects the fulfilment of the heath report sending condition through detecting the time out of the timer, step 88.

Thereafter the node control unit 56 obtains health data internally in the node, step 90, which may be done in the same way as in the first embodiment.

When the health data has been gathered by the node control unit 56, it then sends the health report HR with health data to the wireless terminal 10 via the second node wireless interface NWI2 using the second communication technology T2, step 92, whereupon the wireless terminal receives and processes the health report, which may be done in the same way as in the first embodiment.

It is here possible that the health report HR is only sent if the wireless terminal is within range and also if there exists a pairing between the first network node 18 and the wireless terminal 10.

The third embodiment may be used if the user wants to retrieve the diagnostic information of the health data as the nodes are powered on after the wireless communication network has been set up in order to make some initial adjustments.

The described invention has a number of advantages. It allows the detecting of broken links in wireless networks that lack this type of functionality. The detection is also possible to be made in a fast and efficient way. The invention also allows a wireless terminal to obtain health reports even if it has no ability to communicate using the first communication technology used in the wireless communication network. Furthermore, since health reports are being sent using the second communication technology, they do not waste capacity in the wireless communication network. This means that this network can be used more efficiently for the main activities namely to handle the automation functionality.

There are many possible variations that may be made to the invention in addition to those already mentioned. As mentioned above the wireless terminal may also have the capability to communicate in the wireless communication network. In this case it is also possible to use the first communication technology for connecting to the network gateway device or the network nodes. For this reason it can also be seen that the network gateway device does in fact not have to have the ability to communicate using the second communication technology. It should also be realized that the application is not limited to being downloaded. It may also be installed through connecting the wireless terminal to a computer readable storage medium. The application may furthermore be pre-installed from a server such as a server implementing an application Web shop.

Each of the control units of the wireless terminal, the network gateway device and the network nodes in the group may be provided in the form of a processor with associated program memory including computer program code for performing the functionality of the control unit. A control unit may also be provided in the form of a digital signal processor (DSP), an application specific integrated circuit (ASIC) or a field-programmable gate array (FPGA).

Figure 10:
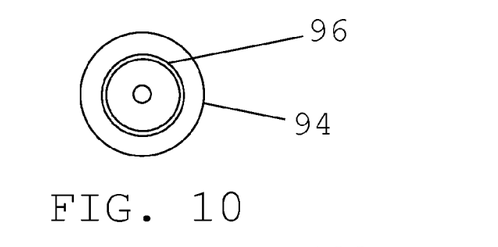
Figure 11:
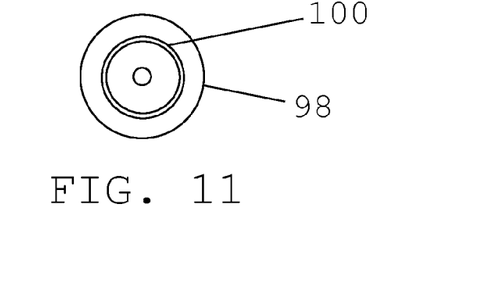

A computer program may also be a computer program product, for instance in the form of a computer readable storage medium or data carrier, like a CD ROM disc or a memory stick, carrying such a computer program with the computer program code, which will implement the functionality of the above-described control units when being loaded into a processor. One such computer program product in the form of a CD ROM disc 94 with the above-mentioned computer program code 96 for a wireless terminal is schematically shown in FIG. 10. Another such computer program product, also in the form of a CD ROM disc 98 with the above-mentioned computer program code 100 for the first network node is schematically shown in FIG. 11.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A wireless terminal for receiving a health report from a wireless communication network comprising a group of network nodes communicating within the wireless communication network using a first communication technology employing a first frequency band, the wireless terminal comprising:
   a first wireless interface for communicating according to a second communication technology employing a second frequency band; and
   a terminal control unit configured to:
      cause a request to be transmitted, via the first communication technology and within the first frequency band, instructing a first node in the group of network nodes to generate and transmit, via the second communication technology and within the second frequency band, a health report with health data; and
      receive, via the second communication technology and over the second frequency band, the at least one health report.

2. The wireless terminal according to claim 1, wherein the request instructs the first node to transmit the health report via the second communication technology and within the second frequency band independent of any status of the first communication technology.

3. The wireless terminal according to claim 2, wherein the terminal control unit is configured to connect to the wireless communication network using the first wireless interface.

4. The wireless terminal according to claim 2, wherein the request is sent, from the wireless terminal, to a network gateway device of the wireless communication network.

5. The wireless terminal according to claim 1, wherein the terminal control unit is configured to cause the request to.

6. The wireless terminal according to claim 1, wherein the fulfilment of the health report sending condition is detected by the first node.

7. The wireless terminal according to claim 1, wherein the health report comprises health data in the group of link quality data, node energy level data, and buffer usage data.

8. The wireless terminal according to claim 1, wherein the terminal control unit is further configured to analyse the health data in order to determine if any wireless link of the first node in the wireless communication network is broken.

9. A system comprising:
the wireless network terminal of claim 1;
the first node, wherein the first node is configured to:
immediately generate the health report in response to receiving the request via the first communication technology and within the first frequency band; and
delay transmission of the health report until determining that the wireless network terminal is, with respect to the second communication technology, within range of the first node.

10. A method for receiving a health report from a wireless communication network comprising a group of network nodes communicating within the wireless communication network using a first communication technology employing a first frequency band, the method being performed in a wireless terminal and comprising:
causing a request to be transmitted, via the first communication technology and within the first frequency band, instructing a first node in the group of network nodes to generate and transmit, via a second communication technology employing a second frequency band, a health report with health data; and
receiving the health report via the second communication technology and over the second frequency band.

11. The method according to claim 10, further comprising, with the wireless terminal, transmitting the request via a communication technology other than the first communication technology.

12. The method according to claim 10, wherein the request instructs the first node to transmit the health report outside the first communication technology.

13. The method according to claim 11, wherein the request is sent to a network gateway device of the wireless communication network.

14. The method according to claim 11, wherein the request is sent to the first network node.

15. The method according to claim 10, wherein the fulfilment of a health report sending condition is detected by the first node.

16. The method according to claim 10, further comprising analysing the health data in order to determine if any wireless link of the first node in the wireless communication network is broken.

17. The method according to claim 10, wherein the first node receives the request via the first communication technology and within the first frequency band;
wherein the first node delays transmission of the health report until determining that the wireless network terminal is, with respect to the second communication technology, within range of the first node.

18. A non-transitory computer-readable medium comprising program code for causing a wireless terminal to perform the method of claim 10.

19. A non-transitory computer-readable medium comprising program code for causing a wireless terminal to perform the method of claim 11.

20. A wireless communication network comprising a group of network nodes communicating within the wireless communication network using a first communication technology employing a first frequency band, the network comprising:
a wireless terminal configured to communicate via a first communication technology employing a first frequency band and via a second communication technology employing a second frequency band;
a first node in the group of network nodes configured to communicate via the first communication technology and via the second communication technology
wherein the wireless terminal is further configured to:
cause a request to be transmitted, via the first communication technology and within the first frequency band, instructing a first node in the group of network nodes to generate and transmit, via the second communication technology and within the second frequency band, a health report with health data; and
receive, via the second communication technology and over the second frequency band, the at least one health report.

21. The system according to claim 20, wherein the request instructs the first node to transmit the health report via a communication technology other than the first communication technology.

22. The system according to claim 21, wherein the request instructs the first node to transmit the health report directly to the wireless terminal.

23. The system according to claim 21, wherein the first node is configured to receive the request, via the first communication technology and within the first frequency band, from a network gateway device.

24. The system according to claim 23, further comprising the network gateway device, which comprises:
a first interface for wireless communication with the nodes of the group using the first communication technology,
at least one further interface for communication using another communication technology, and
a gateway control unit configured to receive, from the wireless terminal and via the further interface, a message and to send the request via the first interface to at least the first node in the group.

25. The system according to claim 24, wherein the at least one further interface comprises a second interface for wireless communication using the second communication technology.

26. The system according to claim 24, wherein the gateway control unit is configured to broadcast the request in the wireless communication network via the first interface.

27. The system according to claim 20, wherein the node is further configured to detect the fulfilment of a health report sending condition.

28. The system according to claim 27, wherein the node control unit is configured to detect the fulfilment of the health report sending condition through detecting an expiry of a timeout period after communication network setup completion.

29. The system according to claim 20, wherein the health data comprises health data in the group of link quality data, node energy level data, and buffer usage data.

30. A method of enabling sending a health report from a wireless communication network that comprises a group of network nodes communicating within the wireless communication network using a first communication technology employing a first frequency band, the method comprising, with a first node in the group of network nodes:
receiving, via the first communication technology and within the first frequency band, a request instructing the first node to generate and transmit, via a second communication technology employing a second frequency band, a health report with health data;
generating the health data in response to the request; and transmitting the health report using the second communication technology and within the second frequency band in response to the request.

31. The method according to claim 30, wherein the request instructs the first node to transmit the health report outside the first communication technology.

32. The method according to claim 31, wherein the first node delays transmission of the health report until determining that a wireless network terminal is, with respect to the second communication technology, within range of the first node.

33. The method according to claim 31, further comprising with the wireless terminal, transmitting the request via a communication technology other than the first communication technology.

34. The method according to claim 33, further comprising receiving, in a network gateway device and from the wireless terminal using a communication technology other than the first communication technology, a message and sending, from the network gateway device using the first communication technology, the request to at least the first node in response to the message.

35. The method according to claim 34, wherein the message is received by the network gateway device using the second communication technology.

36. The method according to claim 34, further comprising, with the network gateway device:
transmitting the request, via the first communication technology and within the first frequency band, to multiple nodes of the group of nodes including the first node;
wherein each of the multiple nodes is configured to delay transmission of the respective health report until determining that the wireless network terminal is, with respect to the second communication technology, within range of the node.

37. The method according to claim 30, further comprising detecting, in the first node, the fulfilment of a health report sending condition.

38. The method according to claim 37, wherein the detecting of the fulfilment of the health report sending condition comprises detecting an expiry of a time out period after communication network setup completion.

39. The method according to claim 30, wherein the health data comprises health data in the group of link quality data, node energy level data, and buffer usage data.

40. A non-transitory computer readable medium comprising code for causing the first node to perform the method of claim 30.

41. A non-transitory computer readable medium comprising code for causing the first node to perform the method of claim 32.

* * * * *